United States Patent
Diab et al.

(10) Patent No.: US 8,276,011 B2
(45) Date of Patent: Sep. 25, 2012

(54) SYSTEM AND METHOD FOR TUNNELING CONTROL OVER A MAC/PHY INTERFACE FOR LEGACY ASIC SUPPORT

(75) Inventors: Wael William Diab, San Francisco, CA (US); Maurice David Caldwell, Robbinsville, NJ (US)

(73) Assignee: Broadcom Corporation, Irvine, CA (US)

( * ) Notice: Subject to any disclaimer, the term of this patent is extended or adjusted under 35 U.S.C. 154(b) by 405 days.

(21) Appl. No.: 12/490,813

(22) Filed: Jun. 24, 2009

(65) Prior Publication Data

US 2010/0241882 A1    Sep. 23, 2010

Related U.S. Application Data

(60) Provisional application No. 61/160,874, filed on Mar. 17, 2009.

(51) Int. Cl.
*G06F 1/32* (2006.01)
*G06F 1/26* (2006.01)

(52) U.S. Cl. ........ 713/320; 713/300; 713/310; 713/321; 713/322; 713/323; 713/324; 713/330; 713/340

(58) Field of Classification Search .................. 370/473, 370/450, 230, 230.1, 231, 200; 713/300, 713/310, 320–324, 330, 340
See application file for complete search history.

(56) References Cited

U.S. PATENT DOCUMENTS

| | | |
|---|---|---|
| 2005/0063413 A1* | 3/2005 | Caldwell et al. ............. 370/450 |
| 2005/0097378 A1* | 5/2005 | Hwang ......................... 713/320 |
| 2006/0153238 A1* | 7/2006 | Bar-On et al. ............... 370/473 |
| 2007/0091805 A1* | 4/2007 | Ramprashad et al. ..... 370/230.1 |
| 2009/0193109 A1* | 7/2009 | Kuo et al. ..................... 709/223 |
| 2009/0204827 A1* | 8/2009 | Diab et al. .................... 713/320 |

OTHER PUBLICATIONS

Clause 36. Physical Coding Sublayer (PCS) and Physical Medium Attachment (PMA) sublayer, type 1000BASE-X, IEEE 802.3-2005.

* cited by examiner

*Primary Examiner* — Fahmida Rahman
(74) *Attorney, Agent, or Firm* — Duane S. Kobayashi

(57) ABSTRACT

A system and method for tunneling control over a MAC/PHY interface for legacy ASIC support. Energy efficient Ethernet control or status information can be communicated over a MAC/PHY interface using control codes that are embedded in sequence ordered sets. These sequence ordered sets would not affect the data flow and can be tunneled within an existing interface (e.g., XAUI, XFI, xxMII or derivative interfaces) without generating errors.

20 Claims, 4 Drawing Sheets

:::page
SYSTEM AND METHOD FOR TUNNELING CONTROL OVER A MAC/PHY INTERFACE FOR LEGACY ASIC SUPPORT This application claims priority to provisional application No. 61/160,874, filed Mar. 17, 2009, which is incorporated by reference herein, in its entirety, for all purposes.

BACKGROUND

1. Field of the Invention

The present invention relates generally to Ethernet systems and, more particularly, to a system and method for tunneling control over a MAC/PHY interface for legacy ASIC support.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

As would be appreciated, an EEE solution typically requires coordination between various layers. For example, an EEE mechanism can be implemented in a physical layer device (PHY) to transition the PHY between various energy states. In supporting these various PHY energy states, the MAC and upper layers (including silicon, software and firmware) would also need to control its operation to implement the EEE control policy. Ideally, a MAC-containing device would be enhanced to accommodate such an EEE mechanism. Otherwise, any PHY innovations for EEE would be rendered useless in systems that contain legacy MAC silicon. What is needed therefore is a mechanism that enables legacy MACs to cooperate with an EEE-enabled PHY.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
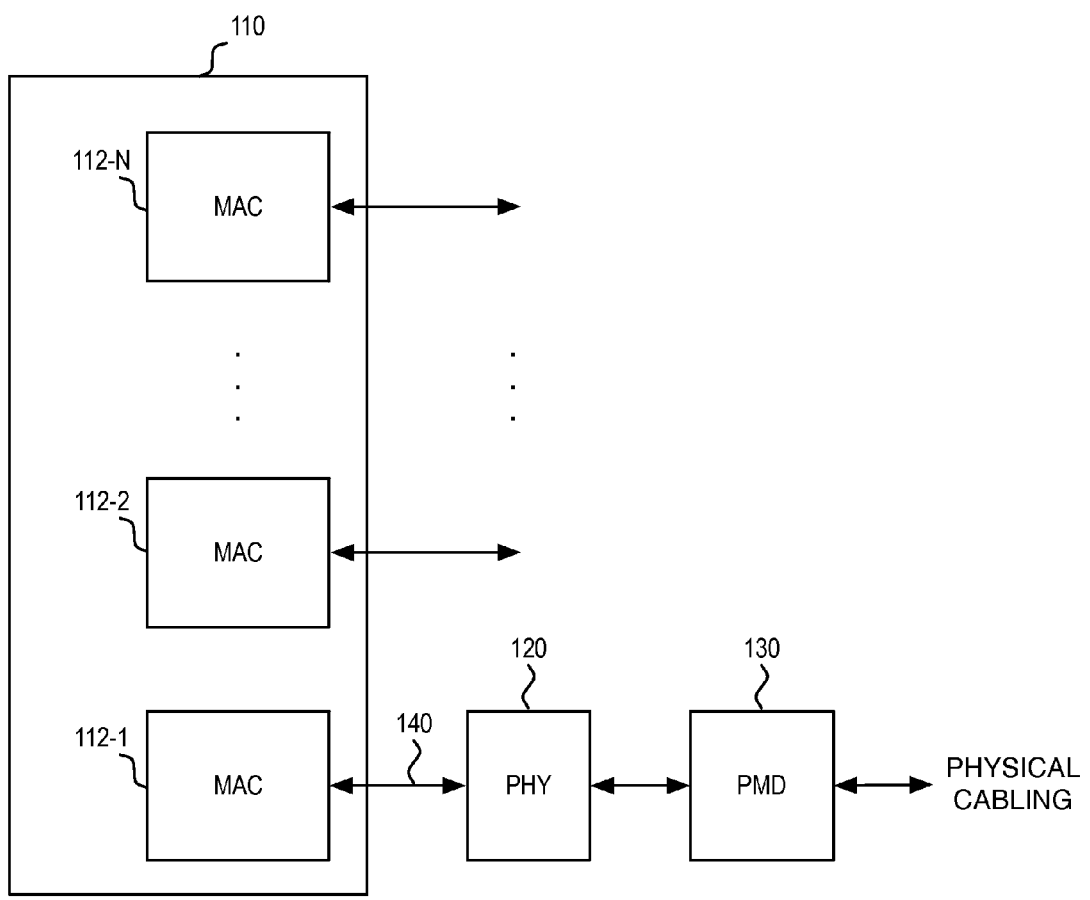
FIG. 1 illustrates an example of a host system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts (e.g., twisted pair, backplane, etc.). IEEE 802.3az Energy Efficient Ethernet (EEE) continues to evaluate various methods for reducing energy used during periods of low link utilization. In this process, a protocol can be defined that would facilitate transition to and from lower power consumption modes in response to changes in network demand.

In general, a reduction in link rate to a sub-rate of the main rate enables a reduction in power, thereby leading to energy savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1 G PHY can be created from a parent 10 GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted.

Another example of subrating is through the use of a low power idle (LPI) technique. In general, LPI relies on turning the active channel silent when there is nothing to transmit. Energy is thereby saved when the link is off. Refresh signals can be sent periodically to enable wakeup from the sleep mode. In one embodiment, a sync signal can be used on the interfaces (i.e., medium dependent interface (MDI) and PHY/medium access control (MAC) interface) to allow for a quick wake-up from the sleep mode and maintain frequency lock. For example, on the MDI interface for a 10 GBASE-T signal, a simple PAM2 pseudorandom bit sequence could be used on pair A during LPI mode. This would not significantly increase the power that is consumed. In general, both the subset and LPI techniques involve turning off or otherwise modifying portions of the PHY during a period of low link utilization.

Regardless of the particular low power consumption modes that are supported by an EEE PHY, the coupling of an EEE PHY with a legacy MAC would render those EEE mechanisms in the PHY useless. It is therefore desirable to be able to reuse existing MAC devices with new EEE PHYs in a manner that does not cripple the PHY's EEE functionality.

This feature is especially valuable when considering the large market of controller or switch chips that integrate a MAC, or legacy chips that include a MAC and PHY but allows for an external PHY connection. In this environment, external EEE PHYs can be coupled to existing legacy MACs. By introducing a mechanism that enables EEE PHY functionality to work with legacy MAC devices, EEE benefits can therefore accrue to the existing legacy devices without requiring an overhaul of the entire device.

FIG. 1 illustrates an example of such an environment. As illustrated, host system 110 supports multiple ports via MAC chips 112-1 to 112-N. MAC chip 112-1, for example, is connected to PHY chip 120 via interface 140 such as an xxMII interface (e.g., MII, GMII, RMII, SMII, RGMII, SGMII, XGMII, etc.).

In one example, PHY chip 120 would contain the physical coding sublayer (PCS) and physical medium attachment (PMA) sublayer. In another example, the PCS can be embodied in MAC chip 112-1 such that interface 140 would not be exposed.

In the illustrated example of FIG. 1, PHY chip 120 does not include the physical medium dependent (PMD) sublayer. The PMD sublayer is implemented instead as separate PMD module 130, which is further connected to some form of physical cabling (e.g., fiber optic cabling, copper cabling, etc.). An advantage of separating the PMD from PHY chip 120 is the creation of a pluggable/removable module that can be added/removed to facilitate changes in the network. One example of such a module is the small form-factor pluggable (SFP) module, which contains optical modular transceivers.

Additional functionality can also be added into the network through the use of a pluggable interface in the chip of the host system. In one embodiment, the chip supporting the pluggable interface can include a serializer/deserializer (SerDes) and/or a MAC. For gigabit applications, SerDes is the PMA function that converts between a ten bit interface (TBI) and serial. A serial gigabit interface can therefore be used for gigabit modules such as SFP and gigabit interface converter (GBIC). For 10 G, the pluggable interface can support the 10 Gigabit Attachment Unit Interface (XAUI) and XFI (a 10 gigabit per second chip-to-chip electrical interface specification) for modules like XENPAK, XPAK, SFP+, etc.

Current EEE methods typically require new PHYs as well as new MACs. As described above, MACs are typically part of a larger switching ASIC and in many chassis systems are not part of the media facing line cards. Accordingly, MACs are typically changed only when an entire replacement of the chassis is performed. For example, a switch can reuse the same technology switch for a long time with multiple product lines that use different PHY technologies for the various media. Maintaining backward compatibility with existing MACs is therefore important.

Figure 2:
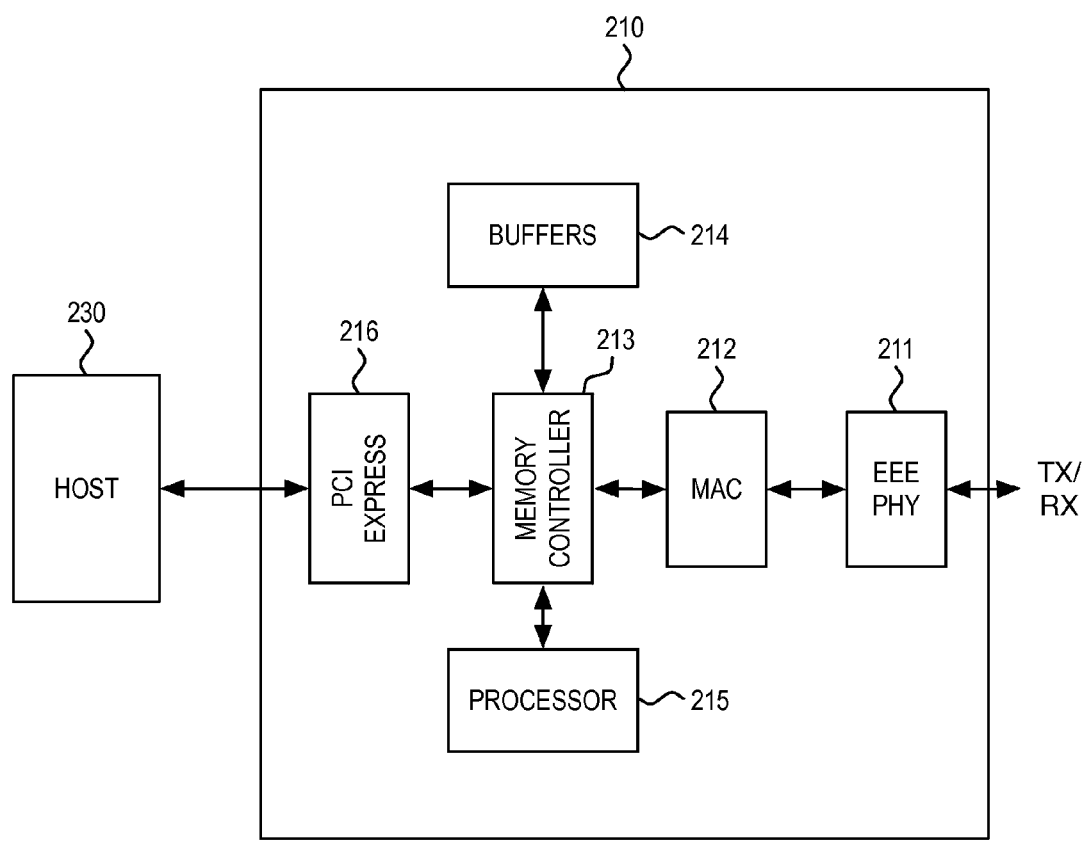
FIG. 2 illustrates an example of a controller.

In accordance with the present invention, a mechanism is provided that enables a MAC-containing device (e.g., network switch, controller, etc.) to operate with an EEE PHY. FIG. 2 illustrates one example of a MAC-containing device embodied as a controller. In various examples, the controller can be part of a client (e.g., laptop, desktop or workstation), a server (e.g., audio-video (AV) server, high performance computing (HPC) server), or a consumer edge device (e.g., HDTV, Blueray, etc.). As illustrated, host system 230 is coupled to integrated Ethernet controller 210. Ethernet controller 210 further includes PHY 211, which is coupled to MAC 212. In the illustrated example, MAC 212 is coupled to PCI Express device 216 via memory controller 213, which is also coupled to buffers 214 and processor 215.

Figure 3:
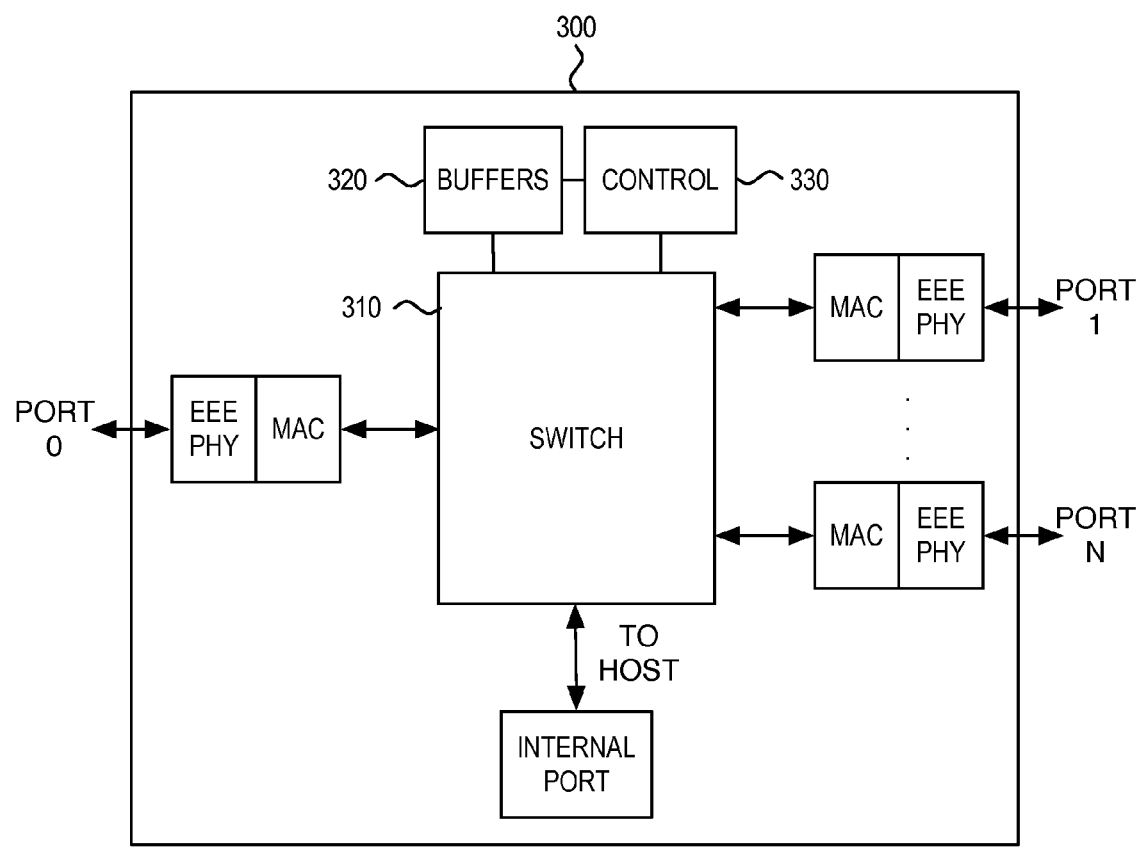
FIG. 3 illustrates an example of a switch.

FIG. 3 illustrates another example of a MAC-containing device embodied as a network switch. In various examples, switching system 300 can represent a router or any other device that incorporates multi-port switch functionality. In various examples, the switch can be a consumer, small and medium-sized businesses (SMB), enterprise, metro, or access switch. In another example, switching system 300 can represent a voice over IP (VoIP) chip that has a network interface (Port 0) and a PC interface (Port 1). In yet another example, switching system 300 can represent a customer premise equipment (CPE) device in a service provider access network that can have an optical central office (CO) facing interface (Port 0) and multiple interfaces (Ports 1-N) that are facing the home and/or gateway (e.g., the CPE can simply be a media converter and/or part of the home gateway). Still further, switching system 300 can represent an access point such as a WLAN base station.

As illustrated, switching system 300 includes switch 310 that supports an internal port and a plurality of external ports 0-N via MAC and PHY interfaces. As would be appreciated, support for an internal port would be implementation dependent. For example, a VoIP phone could include an internal port while a switch box would not. As further illustrated in FIG. 3, switch 310 is also supported by buffers 320 and control 330.

As illustrated, the PHYs of FIGS. 2 and 3 are enhanced EEE PHY devices. These enhanced EEE PHY devices can be incorporated into an existing integrated Ethernet controller 210 or switching system 300. From a system perspective, it is desirable to re-qualify an enhanced EEE PHY device, as compared to re-qualifying an entire new chipset, along with its associated software. For this reason, it is desirable to reuse existing MAC devices with enhanced EEE PHY devices. As noted, this scenario represents a large portion of today's MAC-containing device market.

In accordance with the present invention, existing MAC devices can be reused with enhanced EEE PHYs by the inclusion of a capability in the EEE enhanced PHYs to communicate EEE control and status information with a MAC using control codes. It is a feature of the present invention that control codes can be tunneled through an existing interface (e.g., XAUI, XFI, xxMII or derivative interfaces) without generating errors. Since the control codes are out of the data path, the control codes would not affect the data and allow for quick action.

In one embodiment, sequence or ||Q|| ordered sets can be used. In general, sequence ordered sets consist of a control character followed by three data characters. For example, the format /K28.4/Dx.y/Dx.y/Dx.y/ can be used, where the code group K28.4 has an octet value of 9C and D is any code group. Conventionally, sequence ordered sets have been used to communicate link status information such as the reporting of a local or remote fault. In the present invention, it is recognized that sequence ordered sets provide an advantageous tunneling mechanism to communicate EEE control and status information between a MAC and EEE PHY.

As an example, assume that a 10 G Ethernet controller does not have any hardware support for an EEE enhanced PHY's energy saving state. This transition into the energy saving state can be based on a request from the link partner or the device's own EEE control policy (e.g., triggered when the PCIE goes into an L1 state, buffer level hits a watermark, rate of change of a traffic queue hits a threshold, etc.).

For the case of a request from the device's own EEE control policy (or the TX direction), the local EEE enhanced PHY is instructed by the MAC regarding any change in state. Here, the MAC would send an instruction that is tunneled from the MAC to the EEE enhanced PHY using the sequence ordered set. As would be appreciated, the specific type of instruction that is tunneled over the interface is implementation dependent.

For the case of a request from the link partner (or the RX direction), the local EEE enhanced PHY would initiate its transition into the energy saving state once the remote link partner's TX signals its change in state. The local EEE enhanced PHY would then report the new status/state via a sequence ordered set that is sent up to the MAC and higher layers. This sequence ordered set enables the status/state information to be tunneled from the PHY to the MAC, which thereby signals to the local MAC that it should hold off on sending any data to the EEE enhanced PHY. When the EEE enhanced PHY exits the energy saving state (again due to the link partner request), the EEE enhanced PHY can send another sequence ordered set that indicates to the local MAC that the EEE enhanced PHY has returned to a normal active state and is ready for transmission. To further illustrate the tunneling feature of the present invention in the above example, reference is now made to the flowchart of FIG. 4. As illustrated, the process begins at step 402 where an EEE PHY transitions to an energy saving state. In the present example, the transition can be based upon the signaling form the remote link partner's TX that has also transitioned to an energy saving state. In another example, the transition could be based on a decision by an EEE control policy implemented wholly or partially in the PHY.

Upon such a transition, at step 404, the EEE control in the EEE PHY generates a sequence ordered set that indicates the EEE PHY status/change. In one embodiment, a sequence ordered set can be defined to provide status information using the format /K28.4/D0.0/D=transition/n=state/. This generated sequence ordered set is sent to the legacy MAC at step 406. Upon receipt of the sequence ordered set, the legacy MAC, at step 408, then suspends transmission of traffic to the EEE PHY that originated the sequence ordered set. This transmission suspension would continue until the time that the EEE PHY transitions out of the energy saving state.

Figure 4:
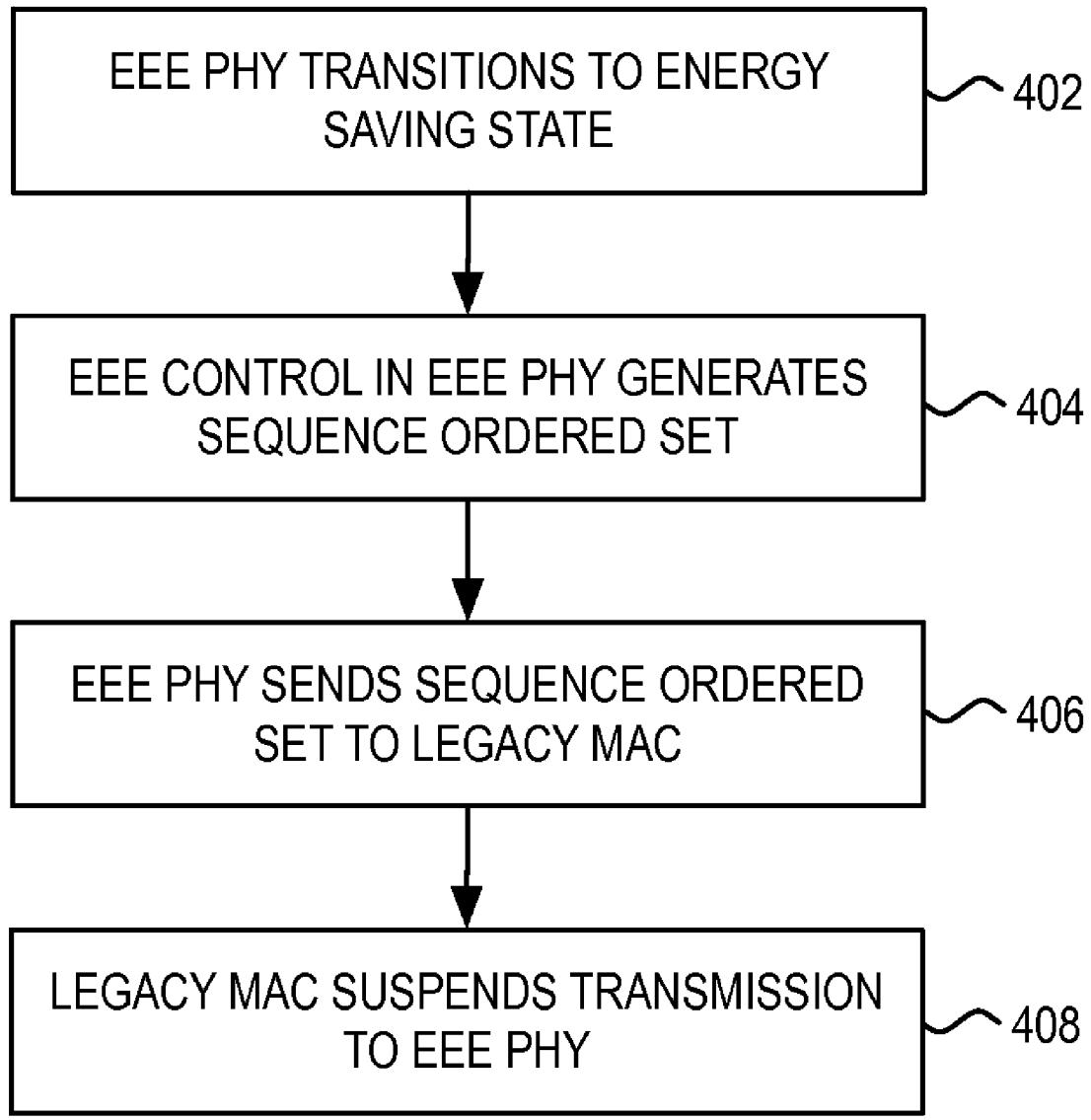
FIG. 4 illustrates a flowchart of a process of communicating EEE control or status information over a MAC/PHY interface.

While the flowchart of FIG. 4 illustrates the passage of state change information from an EEE PHY to a legacy MAC, the features of the present invention are not limited to such an example. In general, various types of EEE control or status information can be transmitted by the MAC or PHY over the MAC/PHY interface using sequence ordered sets. In various other examples, traffic statistics, control commands that initiate an energy saving state change, parameters for configuration (e.g., duty cycle for refresh, parameters for transmitter idle, etc.) can be communicated using the three Dx.y code groups in the sequence ordered set. As would be appreciated, the particular format of data within the Dx.y code groups would be implementation dependent. Significantly, the use of a sequence ordered set to transmit EEE control or status information obviates the need to replace a legacy MAC to facilitate cooperation with the EEE enhancements in the PHY.

As would be appreciated, the principles of the present invention can be used in various MAC/PHY interfaces. The principles of the present invention can also be used where sequence ordered sets are used to signal across the medium dependent interface (MDI).

Further, the principles of the present invention can be used with various PHY types (e.g., backplane, twisted pair, optical, etc.) as well as standard or non-standard (e.g., 2.5 G, 5 G, 10 G, etc.) link rates, as well as future link rates (e.g., 40 G, 100 G, etc.).

It should also be noted that the principles of the present invention can be applied to symmetric or asymmetric applications of EEE. In a symmetric application of EEE, both direction of the link would transition between various power consumption modes in a coordinated fashion. In an asymmetric application of EEE, the two directions of the link would transition between various power consumption modes independently.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficient Ethernet method in a physical layer device, comprising:
   determining, by an energy efficiency control policy contained in the physical layer device, a need to transition between energy saving states, said determination being based on an analysis by said energy efficiency control policy of link utilization indicated by traffic-based measurements, said determination being independent of an energy saving state change command that is directed to the physical layer device from a higher layer;
   generating, in response to said determination of said need to transition between energy saving states, a first physical coding sublayer code group having a value that indicates a sequence ordered set and one or more additional physical coding sublayer code groups that indicate a transition of the physical layer device to a new energy saving state; and
   transmitting information including said first physical coding sublayer code group and said one or more additional physical coding sublayer code groups to a media access control layer, said transmitted information alerting said media access control layer that the physical layer device has transitioned to said new energy saving state.

2. The method of claim 1, wherein said generating comprises generating a sequence ordered set having a /K28.4/Dx.y/Dx.y/Dx.y/ format.

3. The method of claim 1, wherein said transmitting comprises transmitting over an xxMII interface.

4. The method of claim 1, wherein said transmitting comprises transmitting over an XFI interface.

5. The method of claim 1, wherein said transmitting comprises transmitting over a XAUI interface.

6. The method of claim 1, wherein said first physical coding sublayer code group has an octet value of 9C.

7. A physical layer device that is coupled to a media access control layer, the physical layer device being coupled to a remote link partner via a communication link, comprising:
   an energy efficiency control policy, said energy efficiency control policy analyzing utilization of said communication link as indicated by traffic-based measurements, said energy efficiency control policy determining a need to transition between energy saving states based on said analysis, said determination being independent of an energy saving state command by a higher layer, said energy efficiency control policy initiating, in response to said determination a, first physical coding sublayer code group having a value indicates a sequence ordered set and one or more additional physical coding sublayer code groups that indicate a transition of the physical layer device to a new energy saving state; and an interface to said media access control layer, said interface transmitting, from the physical layer device to said media access control layer, information that includes said first physical coding sublayer code group and said one or more additional physical coding sublayer code groups, said transmitted information alerting said media access control layer that the physical layer device has transitioned to a said new energy saving state.

8. The physical layer device of claim 7, wherein said sequence ordered set has a /K28.4/Dx.y/Dx.y/Dx.y/ format.

9. The physical layer device of claim 7, wherein said interface is an xxMII interface.

10. The physical layer device of claim 7, wherein said interface is an XFI interface.

11. The physical layer device of claim 7, wherein said interface is a XAUI interface.

12. The physical layer device of claim 7, wherein said first physical coding sublayer code group has an octet value of 9C.

13. A physical layer device, comprising:
one or more circuits that are configured to:
determine a need to transition between energy saving states, said determination being based on an analysis by an energy efficiency control policy of link utilization indicated by traffic-based measurements, said determination being independent of an energy saving state change command that is directed to the physical layer device from a higher layer;

generate, in response to said determination of said need to transition between energy saving states, a first physical coding sublayer code group having a value that indicates a sequence ordered set and one or more additional physical coding sublayer code groups that indicate a transition of the physical layer device to a new energy saving state; and transmit information including said first physical coding sublayer code group and said one or more additional physical coding sublayer code groups to a media access control layer, said transmitted information alerting said media access control layer that the physical layer device has transitioned to said new energy saving state.

14. The physical layer device of claim 13, wherein said one or more circuits generate a sequence ordered set having a /K28.4/Dx.y/Dx.y/Dx.y/ format.

15. The physical layer device of claim 13, wherein said one or more circuits transmit over an xxMII interface.

16. The physical layer device of claim 13, wherein said one or more circuits transmit over an XFI interface.

17. The physical layer device of claim 13, wherein said one or more circuits transmit over a XAUI interface.

18. The physical layer device of claim 13, wherein said first physical coding sublayer code group has an octet value of 9C.

19. The physical layer device of claim 13, wherein said one or more additional physical coding sublayer code groups include energy saving state status information, energy saving state command information, or energy saving state configuration information.

20. The physical layer device of claim 13, wherein said one or more additional physical coding sublayer code groups include traffic statistics.

* * * * *